United States Patent
Robertson

(10) Patent No.: US 10,284,511 B2
(45) Date of Patent: *May 7, 2019

(54) SYSTEM AND METHOD FOR SELECTION OF MESSAGING SETTINGS ON A MESSAGING CLIENT

(71) Applicant: BlackBerry Limited, Waterloo (CA)

(72) Inventor: Ian Robertson, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 892 days.

This patent is subject to a terminal disclaimer.

(21) Appl. No.: 13/776,906

(22) Filed: Feb. 26, 2013

(65) Prior Publication Data
US 2013/0166665 A1    Jun. 27, 2013

Related U.S. Application Data

(63) Continuation of application No. 10/512,551, filed as application No. PCT/CA03/00606 on Apr. 24, 2003, now abandoned.

(Continued)

(51) Int. Cl.
*H04L 12/58* (2006.01)
*H04L 29/06* (2006.01)
(Continued)

(52) U.S. Cl.
CPC .......... *H04L 51/28* (2013.01); *G06Q 10/107* (2013.01); *H04L 51/04* (2013.01); *H04L 51/14* (2013.01);
(Continued)

(58) Field of Classification Search
CPC ......... H04L 29/00; H04L 51/00; H04L 12/00; H04L 51/14; H04L 51/28; H04L 51/04
(Continued)

(56) References Cited

U.S. PATENT DOCUMENTS

| 5,548,646 A | 8/1996 | Aziz et al. |
| 5,754,306 A | 5/1998 | Taylor et al. |

(Continued)

FOREIGN PATENT DOCUMENTS

| CA | 2399965 | 8/2001 |
| CA | 2399965 A1 | 8/2001 |

(Continued)

OTHER PUBLICATIONS

Fernando Flores, "Computer systems and the design of organizational interaction", ACM Transactions on Information Systems (TOIS) TOIS Homepage archive vol. 6 Issue 2, Apr. 1988, pp. 153-172.*

(Continued)

*Primary Examiner* — Oscar A Louie
*Assistant Examiner* — Messert F Gebre
(74) *Attorney, Agent, or Firm* — Rowand LLP

(57) ABSTRACT

A method and system of selecting messaging settings on a messaging client are provided. When an outgoing message to be sent from the messaging client is addressed to a message recipient, the messaging client accesses a data store to determine whether specific messaging settings have been stored for the message recipient. If specific messaging settings have been stored for the message recipient, the messaging client selects the specific messaging settings for the message recipient to control the message characteristics of the outgoing message.

19 Claims, 5 Drawing Sheets

Related U.S. Application Data

(60) Provisional application No. 60/375,449, filed on Apr. 26, 2002.

(51) Int. Cl.

| | | |
|---|---|---|
| *G06Q 10/10* | (2012.01) | |
| *H04W 4/12* | (2009.01) | |
| *H04W 12/02* | (2009.01) | |
| *H04W 12/10* | (2009.01) | |

(52) U.S. Cl.
CPC ............ *H04L 63/12* (2013.01); *H04L 63/168* (2013.01); *H04W 4/12* (2013.01); *H04W 12/02* (2013.01); *H04W 12/10* (2013.01)

(58) Field of Classification Search
USPC ........................................................ 709/206
See application file for complete search history.

(56) References Cited

U.S. PATENT DOCUMENTS

| | | |
|---|---|---|
| 5,958,005 A | 9/1999 | Thome et al. |
| 6,157,945 A | 12/2000 | Balma et al. |
| 6,157,954 A | 12/2000 | Moon et al. |
| 6,247,045 B1 | 6/2001 | Shaw et al. |
| 6,434,222 B1 | 8/2002 | Shaffer et al. |
| 6,529,942 B1 * | 3/2003 | Gilbert ............... H04L 12/1886 709/206 |
| 6,609,196 B1 | 8/2003 | Dickinson et al. |
| 6,625,642 B1 | 9/2003 | Naylor et al. |
| 6,732,101 B1 * | 5/2004 | Cook |
| 6,981,023 B1 | 12/2005 | Hamilton et al. |
| RE39,360 E | 10/2006 | Aziz et al. |
| 7,155,487 B2 | 12/2006 | Yau et al. |
| 7,209,951 B2 * | 4/2007 | Goldberg ............. G06Q 10/107 707/999.009 |
| 7,430,582 B1 | 9/2008 | Bates et al. |
| 2002/0032738 A1 | 3/2002 | Foulger et al. |
| 2002/0066026 A1 | 5/2002 | Yau et al. |
| 2002/0078158 A1 | 6/2002 | Brown et al. |
| 2002/0099775 A1 * | 7/2002 | Gupta et al. .................. 709/205 |
| 2002/0107904 A1 | 8/2002 | Talluri et al. |
| 2002/0120697 A1 | 8/2002 | Generous et al. |
| 2002/0147778 A1 * | 10/2002 | Dutta ...................... H04L 51/26 709/206 |
| 2002/0169835 A1 | 11/2002 | Paul et al. |
| 2002/0194341 A1 * | 12/2002 | Gupta .......................... 709/227 |
| 2003/0023671 A1 | 1/2003 | Abdulrahiman et al. |
| 2003/0037235 A1 | 2/2003 | Aziz et al. |
| 2003/0131057 A1 * | 7/2003 | Basson ................. G06F 17/248 709/206 |
| 2003/0131063 A1 | 7/2003 | Breck |
| 2003/0196098 A1 | 10/2003 | Dickinson et al. |
| 2004/0006598 A1 | 1/2004 | Bargagli Damm et al. |
| 2005/0091327 A1 | 4/2005 | Koch |
| 2005/0144619 A1 * | 6/2005 | Newman .................. G06F 8/61 717/177 |

FOREIGN PATENT DOCUMENTS

| | | |
|---|---|---|
| CA | 2343905 | 10/2001 |
| CA | 2343905 C | 10/2001 |
| CA | 2414287 | 1/2002 |
| CA | 2414287 C | 1/2002 |
| CA | 2493802 | 2/2004 |
| CA | 2502535 | 4/2004 |
| CA | 2502702 | 4/2004 |
| EP | 0971519 A1 | 1/2000 |
| EP | 1026857 A2 | 8/2000 |
| WO | 9826540 | 6/1998 |
| WO | 9826540 A1 | 6/1998 |
| WO | 0225890 | 3/2002 |
| WO | 0225890 A2 | 3/2002 |

OTHER PUBLICATIONS

Burgess, R.. Dr. Dobbs, "MMURTL: your own 32-bit operating system", Journal19.5: pp. 38, 40, 44-45. (May 1994).*
B. Ramsdell, "S/MIME Version 3 Certificate Handling", RFC2632 (The Internet Society, Jun. 1999), online: RFC 2632—(rfc2632)—S/MIME Version 3 Certificate Handling, pp. 1-13, <http://www.rfcsearch.org/rfcview?lookup_type=RFC&lookup_num=2632> [RFC2632].
B. Ramsdell, "S/MIME Version 3 Message Specification", RFC2633 (The Internet Society, Jun. 1999), online: RFC 2633—(rfc2633)—S/MIME Version 3 Message Specification, pp. 1-32, <http://www.rfcsearch.org/rfcview?lookup_type=RFC&lookup_num=2633> [RFC2633].
Examination Report dated May 28, 2013 from CA 2483407, 7 pgs.
Examination Report dated Mar. 4, Mar. 4, 2014 from CA2483407, 8 pgs.
CIPO, CA Office Action relating to Application No. 2,483,407, dated Feb. 27, 2015.
Ramsdell: "S/MIME Version 3 Certificate Handling", RFC2632 (The Internet Society, Jun. 1999), online: RFC 2632—(rfc2632)—S/MIME Version 3 Certificate Handling <http://www.rfcsearch.org/rfcview?lookup_type=RFC&lookup_num=2632> [RFC2632].
Ramsdell:, "S/MIME Version 3 Message Specification", RFC2633 (The Internet Society, Jun. 1999) online: RFC 2633—(rfc2633)—S/MIME Version 3 Message Specification <http://www.rfcsearch.org/rfcview?lookup_type=RFC&lookup_num=2633> [RFC2633].
International Search Report dated Sep. 29, 2003 from PCTCA200300606, 7 pgs.
Written Opinion dated Dec. 23, 2003 from PCTCA200300606, 6 pgs.
International Preliminary Examination Report dated May 6, May 6, 2004 from PCTCA200300606, 15 pgs.
Hart, Michael: "Corporate Liability for Employee Use of the Internet and E-mail: Steps to Take to Reduce the Risks"; Aug. 1998; Computer Law & Security Report; vol. 14, issue 4; pp. 223-231.
Examination Report dated Feb. 12, 2010 from CA2483407, 3 pgs.
Ramsdell, B.: "RFC 2633: S/MIME Version 3 Message Specification", IETF Network Working Group, Jun. 1999, XP002262227, http://www.ietf.org/rfc/rfc2633.txt, pp. 1-32.
TechSupportGuy01; "Chose Wrong Program Association"; May 24, 2000; forums.techguy.org discussion thread; pp. 1-2; retrieved from http:l/forums.techguy.org/earlier-versions-windows/21573-chose-wrong-program-association.html on Jun. 4, 2012.

* cited by examiner

SYSTEM AND METHOD FOR SELECTION OF MESSAGING SETTINGS ON A MESSAGING CLIENT

REFERENCE TO PRIOR APPLICATIONS

This application is a continuation of U.S. application Ser. No. 10/512,551, filed Oct. 25, 2004, which is a National Phase of International Application No. PCT/CA2003/00606, filed Apr. 24, 2003, which claims priority from U.S. application Ser. No. 60/375,449, filed Apr. 26, 2002, the entireties of which are incorporated herein by reference.

BACKGROUND

1. Field of the Invention

This invention relates generally to the field of secure electronic messaging, and in particular to selecting messaging configuration settings on a messaging client.

2. Description of the Related Art

Known secure messaging software clients, such as e-mail software applications operating on desktop computer systems, can use only one set of messaging settings at a time. Messaging settings may be established by using a mouse, a keyboard or another input device, for example, to configure such message characteristics as formats, fonts, and common text that should appear in all outgoing messages, as well as secure messaging characteristics such as message signing and encryption. Although a user may establish more than one group of settings, only one group, previously selected as current or default settings, controls messaging operations on a messaging client at any time. In order to configure different message characteristics for an outgoing message than those established in the current settings, the current settings must be over-ridden or another group of settings must be selected. These operations tend to be cumbersome, particularly when message characteristics must be changed frequently, such as when the addressees of outgoing messages have different messaging capabilities.

SUMMARY

According to one aspect of the invention, a method of selecting messaging settings on a messaging client is provided. The method includes the steps of composing an outgoing message, addressing the outgoing message to a message recipient, determining whether specific messaging settings have been established for the message recipient, and selecting the specific messaging settings to control message characteristics of the outgoing message where specific messaging settings for the message recipient have been established.

A system for selecting messaging settings is also provided in accordance with another aspect of the invention. The system includes a data store configured to store a plurality of specific messaging settings, and a messaging client configured to send messages, each of the messages having message characteristics and being addressed to a message recipient, to access the data store to determine whether specific messaging settings have been stored for the message recipient to which a message is addressed and to select the specific messaging settings for the message recipient to control the message characteristics of the outgoing message where specific messaging settings have been stored for the message recipient.

DETAILED DESCRIPTION

Messaging settings may control general message characteristics such as message format and fonts for both unsecure messages and secure messages. Unsecure messages include, for example, classical e-mail messages that are exchanged between messaging clients through the Internet. Secure message characteristics such as message signing and encryption may also be controlled by establishing message settings. Secure messages may be signed with a digital signature, encrypted, or both signed and encrypted, and possibly also processed in other ways by a message sender or intermediate system between a message sender and a messaging client which receives the secure message. For example, a secure message may be signed, encrypted and then signed, or signed and then encrypted by a message sender according to variants of Secure Multipurpose Internet Mail Extensions (S/MIME). A secure message could similarly be encoded, compressed or otherwise processed either before or after being signed and/or encrypted. Thus, a group of message settings may include general message settings, secure message settings, or both.

A messaging client allows a system on which it operates to receive and possibly also send messages. Messaging clients may operate on a computer system, a handheld device, or any other system or device with communications capabilities. Many messaging clients also have additional non-messaging functions.

Figure 1:
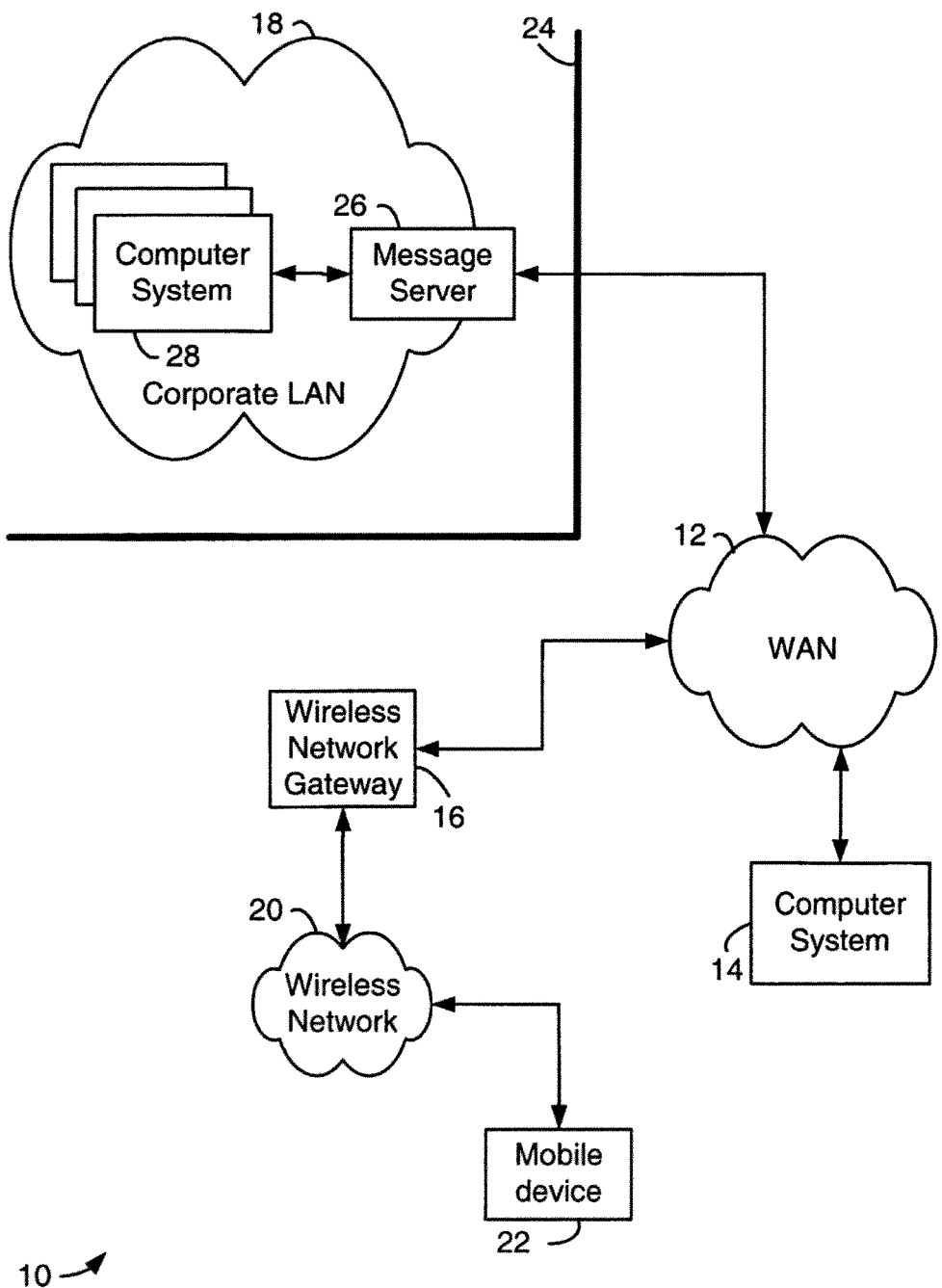
FIG. 1 is a block diagram of an exemplary messaging system.

FIG. 1 is a block diagram of an exemplary messaging system in which the present invention may be implemented. The system 10 includes a Wide Area Network (WAN) 12, coupled to a computer system 14, a wireless network gateway 16, and a corporate Local Area Network (LAN) 18. The wireless network gateway 16 is also coupled to a wireless communication network 20, in which a wireless mobile communication device 22 ("mobile device") is configured to operate.

The computer system 14 may be a desktop or laptop personal computer (PC), which is configured to communicate to the WAN 12, the Internet, for example. PCs, such as computer system 14, normally access the Internet through an Internet Service Provider (ISP), an Application Service Provider (ASP), or the like.

The corporate LAN 18 is an example of a network-based messaging client. It is normally located behind a security firewall 24. Within the corporate LAN 30, a message server 26, operating on a computer behind the firewall 24 serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers to route and deliver mail messages. The message server 26 may also provide additional functionality, such as dynamic database storage for calendars, todo lists, task lists, e-mail, electronic documentation, etc.

The message server 26 provides messaging capabilities to the corporation's networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and are then accessed by a user through a messaging client operating in conjunction with a computer system 28.

The wireless gateway 16 provides an interface to a wireless network 20, through which messages may be exchanged with a mobile device 22. Such functions as addressing of the mobile device 22, encoding or otherwise transforming messages for wireless transmission, and any other required interface functions are performed by the wireless gateway 16. The wireless gateway may be configured to operate with more than one wireless network 20, in which case the wireless gateway 16 may also determine a most likely network for locating a given mobile device user and track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers could also be implemented to provide a private interface to a wireless network. For example, a wireless VPN implemented in the LAN 18 provides a private interface from the LAN 18 to one or more mobile devices 22 through the wireless network 20. Such a private interface to mobile devices 22 via the wireless network gateway 16 and/or the wireless network 20 may also effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, the wireless network gateway 16, or some other interface, to the wireless network 20 and to the user's mobile device 22. Another alternate interface to a user's mailbox on a message server 26 is a Wireless Application Protocol (WAP) gateway. In one such implementation, a list of messages in a user's mailbox on the message server 26, and possibly each message or a portion of each message, is sent to the mobile device 22 through a WAP gateway.

A wireless network 20 normally delivers messages to and from mobile devices 22 via RF transmissions between base stations and mobile devices 22. The wireless network 20 may, for example, be: (1) a data-centric wireless network, (2) a voice-centric wireless network, or (3) a dual-mode network that can support both voice and data communications over the same infrastructure. Recently developed wireless networks include: (1) the Code Division Multiple Access (CDMA) network, (2) the Groupe Special Mobile or the Global System for Mobile Communications (GSM) and the General Packet Radio Service (GPRS) networks, and (3) third-generation (3G) networks, such as Enhanced Data rates for Global Evolution (EDGE) and Universal Mobile Telecommunications Systems (UMTS), which are currently under development. GPRS is a data overlay on the existing GSM wireless network, which is used in many parts of the world.

Examples of data-centric networks include: (1) the Mobitex™ Radio Network ("Mobitex"), and (2) the DataTAC™ Radio Network ("DataTAC"). Examples of known voice-centric networks include Personal Communication Systems (PCS) networks like CDMA, GSM, and Time Division Multiple Access (TDMA) systems that have been available in North America and world-wide for nearly 10 years.

The mobile device 22 may be a data communication device, a voice communication device such as a mobile telephone with data communications functionality, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and then routed through the Internet to one or more message receivers. E-mail messages are normally sent in the clear and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also or instead be encoded, compressed or otherwise processed. It will be appreciated by those skilled in the art that the techniques described herein are in no way restricted to the above secure messaging schemes, or even to secure messaging. Secure messaging settings represent an illustrative example of one type of messaging settings to which the selection techniques of the present invention are applicable. It should also be appreciated that these techniques are applicable to other types of messaging than email, including instant messaging and Short Messaging Service (SMS), for example.

Figure 2:
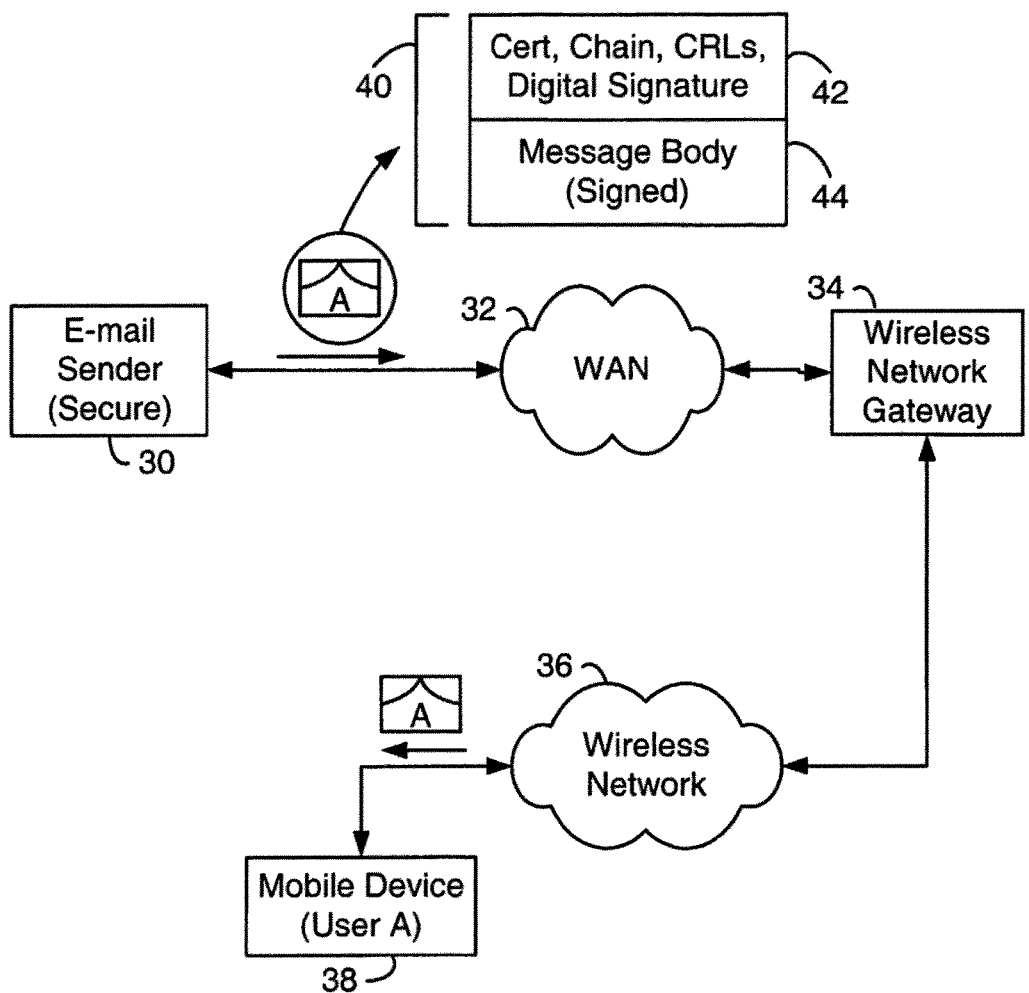
FIG. 2 is a block diagram illustrating a secure e-mail message exchange in a messaging system.

FIG. 2 is a block diagram illustrating a secure e-mail message exchange in a messaging system. The system includes an e-mail sender 30, coupled to a WAN 32, and a wireless network gateway 34, which provides an interface between the WAN 32 and a wireless network 36. A mobile device 38 is adapted to operate within the wireless network 36.

The e-mail sender 30 may be a PC, such as 14 or 28 in FIG. 1, or a mobile device, on which a messaging client operates to enable e-mail messages to be composed and sent. The WAN 32, the wireless network gateway 34, the wireless network 36, and the mobile device 38 are substantially the same as similarly-labelled components in FIG. 1.

According to a public key signature scheme, a secure e-mail message sender 30 typically signs a message by using the sender's signature private key to perform an encryption or some other transformation operation on a message or a digest of the message to generate a digital signature in accordance with a signature algorithm. Those skilled in the art will appreciate that although completion of a digital signature algorithm requires a secret key known only to the message sender, portions of some signature algorithms, such as generating a digest of parts of a message using Secure Hashing Algorithm 1 (SHA-1) or Message Digest algorithm 5 (MD5), for example, do not involve the secret key.

The digital signature is then appended to the outgoing message. In addition, a digital Certificate (Cert) of the sender, which includes the sender's signature public key and sender identity information that is bound to the public key with one or more digital signatures, and possibly any chained Certs and Certificate Revocation Lists (CRLs) associated with the Cert and any chained Certs, may also be included with the outgoing message.

The example secure e-mail message 40 sent by the e-mail sender 30 includes a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message may include addressing information, such as "To:" and "From:" email addresses, and other header information.

When the secure e-mail message 40 is sent from the e-mail sender 30, it is routed through the WAN 32 to the wireless network gateway 34. Although the e-mail sender 30 sends the message 40 directly to the wireless network gateway 34, in an alternative implementation the message is instead delivered to a computer system associated with the mobile device 38 and then sent to the mobile device 38 by the associated computer system. As described above, in a further alternative embodiment, the message is routed or redirected to the mobile device 38 through the wireless network 36 via a wireless VPN router or other interface.

The receiver of the signed message 40, the mobile device 38, checks the digital signature 42 using the sender's signature public key (in a public key signature scheme) and a signature verification algorithm corresponding to the signature algorithm used by the message sender 30. If the secure message 40 was encrypted or otherwise processed by the sender 30 after being signed, then the mobile device 38 first decrypts or performs other inverse processing operations on the message before signature verification is performed. If encryption or processing was performed before signing, however, inverse processing such as decryption is performed after signature verification.

In order to verify the digest signature, the receiver 38 retrieves the signature public key of the sender 30, generally by extracting the public key from the sender's Cert 42 attached to the message 40, and then performs the signature verification algorithm using the retrieved public key. The secure message 40 shown in FIG. 2 includes the sender's Cert 42, from which the sender's public key can be extracted. The sender's public key may also be retrieved from a local store, for example where the public key was extracted from an earlier message from the sender 30 and stored in a key store in the receiver's local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. The digital signature in a Cert is generated by the issuer of the Cert, and can be checked by a message receiver as described above. A Cert may include an expiry time or validity period from which a messaging client may determine if the Cert has expired. Each Cert may also be checked against a CRL to ensure that the Cert has not been revoked.

If the digital signature in a message sender's Cert is verified, the Cert has not expired or been revoked and the issuer of the Cert is trusted by a message receiver, then the digital signature of the message is trusted by the message receiver. If the issuer of the Cert is not trusted by the receiver, then the message receiver may trace a certification path through the Cert chain to verify that each Cert in the chain was signed by its issuer, whose Cert is next in the Cert chain, until a Cert is found that was signed by a root Cert from a source trusted by the receiver, such as from a large PKS. Once a root Cert is found, then a signature can be trusted, because both the sender and receiver trust the source of the root Cert. This trust mechanism is used, for example, in S/MIME. Although other messaging schemes, including PGP, for example, may use different trust mechanisms, the present invention is in no way dependent upon a particular signature scheme or trust mechanism.

At the e-mail sender 30, secure messaging characteristics, message signing in the message 40, may be controlled by messaging settings, either default messaging settings or a currently selected group of messaging settings established by a user, or by over-riding default or current messaging settings. In known systems, whenever a message having different message characteristics than those specified in a current group of message settings is to be sent from a messaging client, a different group of messaging settings must be selected or current setting must be over-ridden.

Frequent messaging settings changes are not only tedious and time consuming, but are also prone to error. For example, some secure messaging clients may be configured to exchange either secure or unsecure messages with other messaging clients. However, as described above, known messaging clients allow only a single group of messaging settings to be active at any time. Therefore, when a secure messaging client exchanges messages with unsecure messaging clients relatively often, a user of the secure messaging client may normally select only general messaging settings as default messaging settings to ensure that sent messages may be processed by unsecure messaging clients. Then, when a secure message is to be sent to a secure messaging client, a different group of settings is selected or the current general messaging settings are over-ridden, so that a secure message is sent. When a user forgets to select secure messaging settings or over-ride general messaging settings, a message that was intended to be sent securely is sent in the clear. This situation may be particularly undesirable when such a message contains confidential or otherwise sensitive information. Similarly, when secure messaging settings are used as default settings and not over-ridden when a message is to be sent to an unsecure messaging client, the unsecure messaging client will be unable to process the secure message and the message sender must re-transmit the message in an unsecure format. In most cases, however, a sender is not aware that a recipient is unable to process a received message until the recipient informs the sender that the message could not be processed. As such, re-sending is not typically performed in a timely manner, which is a substantial problem when a message includes time-critical information.

Figures 3, 4:
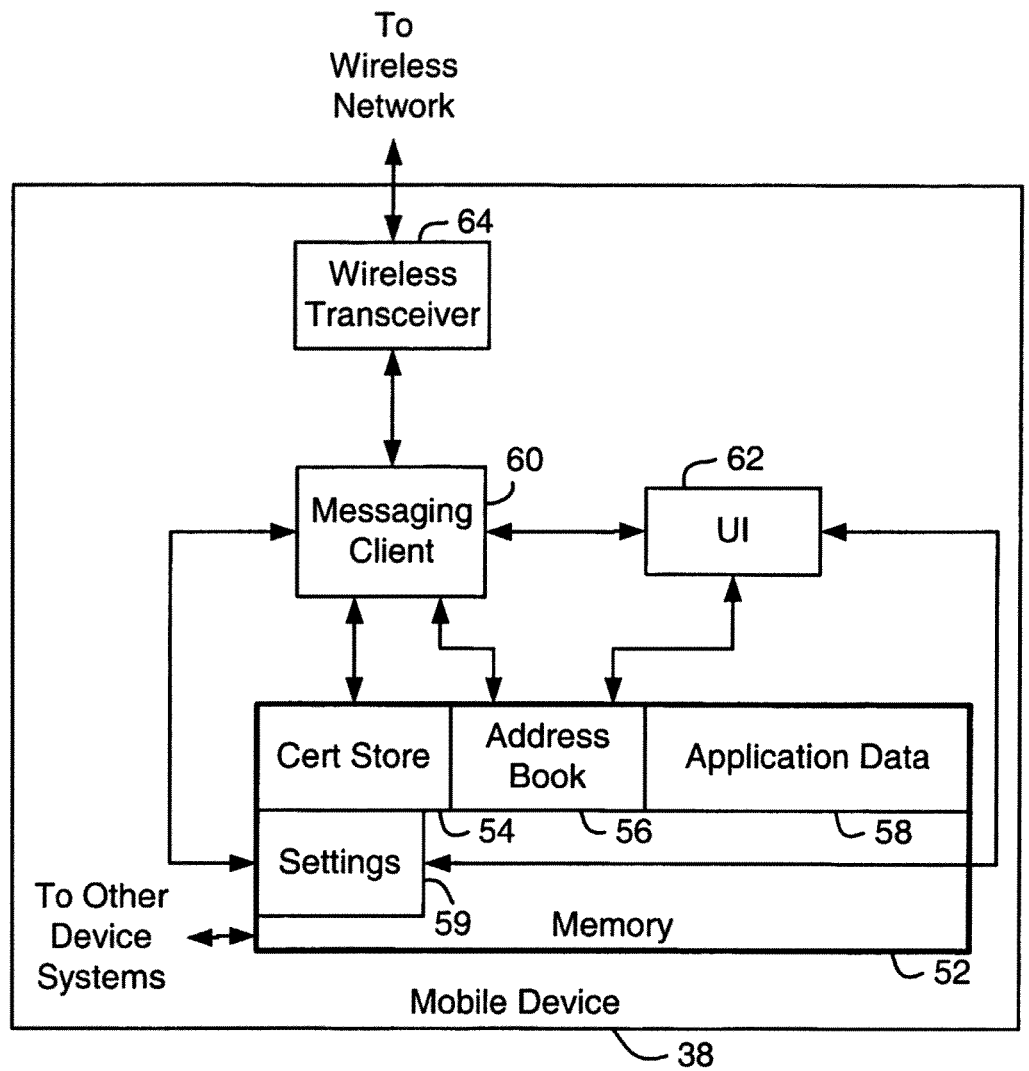
FIG. 3 is a block diagram of a wireless mobile communication device implementing an automatic messaging setting selection system.
FIG. 4 is a block diagram showing an exemplary address book entry that supports messaging settings selection.

FIG. 3 is a block diagram of a wireless mobile communication device implementing an automatic messaging setting selection system.

The mobile device 38 includes a memory 52, a messaging client 60, a user interface (UI) 62, and a wireless transceiver 64.

The memory 52 is a writeable store such as a RAM into which other device components and systems may write data, and preferably includes a storage area for a Cert store 54, an address book 56 in which messaging contact information is stored, an application data storage area 58 which stores data associated with software applications on the mobile device 38, and a settings store 59 which stores messaging settings. Data stores 54, 56, 58 and 59 are illustrative examples of stores that may be implemented in a memory 52 on mobile device 38. The memory 52 may also be used by other device systems in addition to those shown in FIG. 3, and used to store other types of data.

The messaging system 60 is connected to the wireless transceiver 66 and is thus enable for communications via a wireless network.

The UI 64 may include such UI components as a keyboard or keypad, a display, or other components which accept inputs from or provide outputs to a user of the mobile device 38. A mobile device 38 typically includes more than one UI, and the UI 64 therefore represents one or more user interfaces.

The messaging client 60 stores received Certs to the Cert store 54 and also retrieves stored Certs from the Cert store 54. Certs are normally stored in the Cert store 54 in the format in which they are received, but may alternatively be parsed or otherwise translated into a storage format before being written to the store 54. Certs may be received with secure messages, requested from a Cert source such as a PKS via the wireless transceiver 64, or loaded onto the mobile device 38 through a communications interface such as a serial port, a Universal Serial Bus (USB) port, an Infrared Data Association (IrDA) port, an 802.11 module, or a Bluetooth™ module, from a similarly equipped external system, a PC for example. Those skilled in the art will appreciate that "802.11" and "Bluetooth" refer to sets of specifications, available from the Institute of Electrical and Electronics Engineers, relating to wireless LANs and wireless personal area networks, respectively. Cert loading from further sources my be supported via such other interfaces as a smart card reader or a Secure Digital (SD) port. As described above, a public key in a Cert may be required for sending or receiving secure messages.

The address book 56 stores contact information, at least some of which is preferably used by the messaging client 60 in messaging operations. Entries in an address book 56 are typically most often used for addressing messages to be sent from a messaging client. Address book entries are also used to replace addressing information, such as an e-mail address, with a personal or familiar name when a message that is received from a sender for which an address book entry exists in the address book 56 is displayed to a user of the mobile device 38. An address book entry can typically be created either manually, for example by inputting contact information or selecting an address from a received message using a UI 62, or automatically, such as by configuring the messaging client 60 to store contact information when a message is received from a sender for which no entry exists in the address book 56. Contact information could also possibly be extracted and stored in the address book 56 when a new Cert is stored to the Cert store 54, as described in the co-pending International Patent Application Serial No. PCT/CA03/00406, entitled "Certificate Information Storage System And Method", assigned to the assignee of the present application and incorporated herein by reference.

The settings store 59 stores messaging settings which control the characteristics of outgoing messages sent from the mobile device 38. The settings store 59 may store more than one group of messaging settings, although in known systems, only one previously selected group of settings is active at any time. A typical messaging client determines which group of messaging settings was previously selected and uses the settings to control the characteristics of an outgoing message.

The messaging client 60, however, is configured to provide for selection of messaging settings for each outgoing message. This feature may be enabled, for example, for each address book entry. FIG. 4 is a block diagram showing an exemplary address book entry that supports messaging settings selection.

The address book entry 70 includes multiple contact information fields, for a first name 72, a last name 74, an e-mail address 76, a mailing address 78, other contact information 80, and messaging settings 82. An actual address book entry may contain more, fewer or different fields than those shown in FIG. 4, and some fields in an address book entry may possibly be blank. For example, the messaging client 60 may require only an e-mail address 76 in order to use an address book entry 70 to address an outgoing message and may thus use an address book entry 70 if other fields are blank. The messaging client 60, or alternatively other device components, may be configured to use other fields in the entry 70 when they are populated. The absence of information in one or more fields in an incomplete address book entry preferably does not preclude use of other populated fields in the address book entry.

The content of fields 72 through 78 will be apparent from the labels in FIG. 4. The field 80 may include such other contact information as a telephone number, a fax number, and the like for an associated contact. The messaging settings field 82 preferably includes a group of messaging settings to be used to control the characteristics of any messages sent to the contact to which the entry 70 corresponds. Messaging settings are preferably manually configurable by a user of the mobile device 38, using a UI 62 such as a keyboard and a settings function of the messaging client 60, for example. Address book entries may instead be configured to allow editing thereof to establish or change messaging settings. Once established for a contact, messaging settings are stored in the messaging settings field 82. Alternatively, as described in further detail below, messaging settings may be stored in another data store or memory, and a memory pointer or other identifier that may be used to access the stored messaging settings is stored in the settings field 82.

When the address book 56 includes entries having a messaging settings field 82, messaging settings are selected for each message that is to be sent by the messaging client 60 based on a message addressee.

In operation, a message is composed on the mobile device 38 using UIs 62 such as a keyboard and a display. The messaging client 60 is normally configured to send new messages and reply messages, and also to forward received messages. When a recipient for an outgoing message is selected from the address book 56, before or after the message has been composed or possibly while the message is being composed, the messaging client 60 accesses the messaging settings field 82 in the address book entry 70 to determine the messaging settings that should be used to control message characteristics of the outgoing message.

The messaging settings field 82 may contain either the actual messaging settings for messages addressed to the particular contact to which the address book entry 70 corresponds, or possibly an identifier or pointer to a group of messaging settings that have been established and stored in the memory 52, in the settings store 59 for example. If the messaging settings field 82 includes an identifier or pointer, then the messaging client 60 accesses the settings store 59 to select the corresponding settings to control message characteristics. The use of such an identifier or pointer reduces the overall memory storage space required when a group of messaging settings is used for several contacts in an address book 56. In this case, the actual settings are stored in the settings store 59 only once and then accessed and used each time a corresponding identifier or pointer is found in an address book entry. For example, a user may wish to establish common messaging settings to be used for every contact having an e-mail address associated with a particular domain. The user may then establish the common messaging settings, in the settings store 59 for example, and include a pointer or messaging settings name in each address book entry having an e-mail address associated with that domain. In this particular example, the messaging client 60 may instead be configured to determine a domain name of a recipient e-mail address of an outgoing message and then access the settings store 59 to determine whether common messaging settings have been established for the domain name.

As described above, messaging settings may control general message characteristics, such as formats and fonts, as well as secure message characteristics, such as signing and encryption. When the selected messaging settings dictate that a secure message is to be sent, the messaging client 60 retrieves any required keys and processes the outgoing message as specified in the selected messaging settings. For example, when the selected messaging settings, contained or identified in the messaging settings field 82, specify that a signed and then encrypted S/MIME message is to be sent, then the messaging client 60 may use its own private key to generate a digital signature for the message, generate a session key, and use the session key to encrypt the message and the digital signature, retrieve a public key or Cert for the message recipient from the Cert store 54, and encrypt the session key with the public key.

This technique for selection of messaging settings allows a user of the messaging client 60 to establish preferred messaging settings for each contact for which an entry has been created and stored in the address book 56. Each time a message is sent to such a contact, the preferred messaging settings are selected and used, so that a user is not required to manually over-ride default or currently active messaging settings. Once messaging settings have been selected for a message, the messaging client preferably displays a settings indicator so that a user of the messaging client can quickly determine how the message will be sent. A settings indicator may be a messaging settings name, a type of message such as "signed S/MIME", or some other indicator from which the selected messaging settings will be apparent to the user.

Messaging settings may be established for a contact, by manually configuring settings using a UI 62 for example, based on the relationship between the user of a messaging client 60 and the contact. For example, a user may establish messaging settings for only general message characteristics for personal contacts if message security is not important for message exchange with personal contacts. The same user may establish messaging settings for both general and secure message characteristics for business contacts. For instance, when message exchange with internal business contacts in the same company are already secure, when an encryption scheme is used for all communications between corporate users, or when all user workstations operate within a network behind a firewall, for example, a user may establish messaging settings to specify that outgoing messages should only be signed using S/MIME. The user may also establish another group of messaging settings for external business contacts to specify that messages to any such contacts should be encrypted and signed using PGP, for example. Other criteria may also be used to determine the particular messaging settings that are established for any contact in an address book 56.

Many messaging clients permit a user to create distribution lists including multiple contacts. Messaging settings may preferably be established for such distribution lists separately from those for each contact in the list. When a single contact is addressed directly in an outgoing message, the messaging settings associated with that contact are selected and used to control message characteristics of the outgoing message. If the same contact appears in a distribution list that is used to address another outgoing message, then messaging settings for the distribution list are selected. The use of such distribution list messaging settings avoids contention between conflicting messaging settings for contacts in the list. Such settings conflicts are effectively resolved by a user when distribution list messaging settings are established. In a further enhancement of basic distribution list settings implementation, the messaging client 60 is configured to identify conflicting messaging settings between any contact and a distribution list to which the contact is added, and to alert a user to the conflict. The user is then able to establish appropriate distribution list messaging settings, drop the contact from the distribution list, edit messaging settings for the contact, or take some other action to resolve the conflict.

A similar messaging settings conflict resolution scheme may also be implemented when an outgoing message is separately addressed to multiple recipients, by configuring the messaging client 60 to alert a user to any conflicting messaging settings for the recipients, whether the recipients are multiple contacts with respective messaging settings, multiple distribution lists with distribution list messaging settings, or some combination of contacts and distribution lists. The user then selects the messaging settings that should be applied to the outgoing message. The messaging client 60 preferably allows a user to specify that the messaging settings associated with each recipient should be applied to the outgoing message, in which case the messaging client 60 generates different versions of the outgoing message having different message characteristics according to recipient messaging settings. Where distribution list messaging settings are not enabled or established, then this feature also provides for resolution of messaging settings conflicts between contacts in a distribution list when a composed message is addressed to the list instead of when the list is created.

The use of contact-specific messaging settings, group-specific messaging settings and/or distribution list-specific messaging settings as described above preferably does not preclude the use of default messaging settings. For example, a user may establish certain messaging settings to control message characteristics when no messaging settings have been established for one or more recipients of an outgoing message, such as when a new recipient e-mail address is entered manually or a user replies to a message received from a contact for which no address book entry exists.

The default messaging settings may also be used even when specific messaging settings have been established, when the default and specific messaging settings relate to different messaging characteristics. A user may thereby control some message characteristics with default settings and other characteristics with specific settings. In the event of a conflict between the default and specific messaging settings for any message characteristics, the specific settings preferably take precedence, although a messaging settings conflict resolution scheme as described above may instead be used.

Many messaging clients 60 allow a user to set recipient addresses in outgoing messages in different ways. Recipient addresses may be selected from an address book 56 as described above, but addresses may also be entered by a user using a UI 62 such as a keyboard or keypad, or inserted by the messaging client 60, when an outgoing message is a reply message for example. Messaging settings selection when a recipient address is selected from an address book 56 has been described above. When an address is entered manually or inserted by the messaging client 60, however, the messaging client 60 preferably accesses the address book 56 and possibly the settings store 59 to determine whether messaging settings for the address, or similar addresses, have been established. If an address book entry which includes the address is found, then messaging settings specified or identified in the address book entry are selected for the outgoing message. Where messaging settings have been stored to the settings store 56 for a domain name in an email address, a company or division name, or some other identifier associated with the address, then those settings are selected. Thus, messaging settings selection need not be dependent upon addressing an outgoing message by recipient address selection from an address book 56.

Messaging settings selection preferably does not prevent a user from over-riding currently selected messaging settings. In some circumstances, a user may wish to over-ride default or selected messaging settings. For instance, if a personal message is to be sent to an external business contact for which messaging settings have been established to specify that outgoing messages to the contact should be signed and encrypted, then the user may wish to over-ride the messaging settings to send an unsecure message. Similarly, when no specific messaging settings have been established for a recipient of an outgoing message, a user may over-ride default messaging settings to control message characteristics of the outgoing message.

The messaging client 60 may be configured to detect when default or specific messaging settings are over-ridden, and to prompt the user to decide whether stored messaging settings should be updated to reflect the resultant new messaging settings. If specific messaging settings are over-ridden, then the specific messaging settings may be updated.

When default messaging settings are over-ridden, then the resultant messaging settings may be used to update specific messaging settings, if they exist, or if not, to establish new specific messaging settings, for the outgoing message recipient(s) for which messaging settings were over-ridden.

Figure 5:
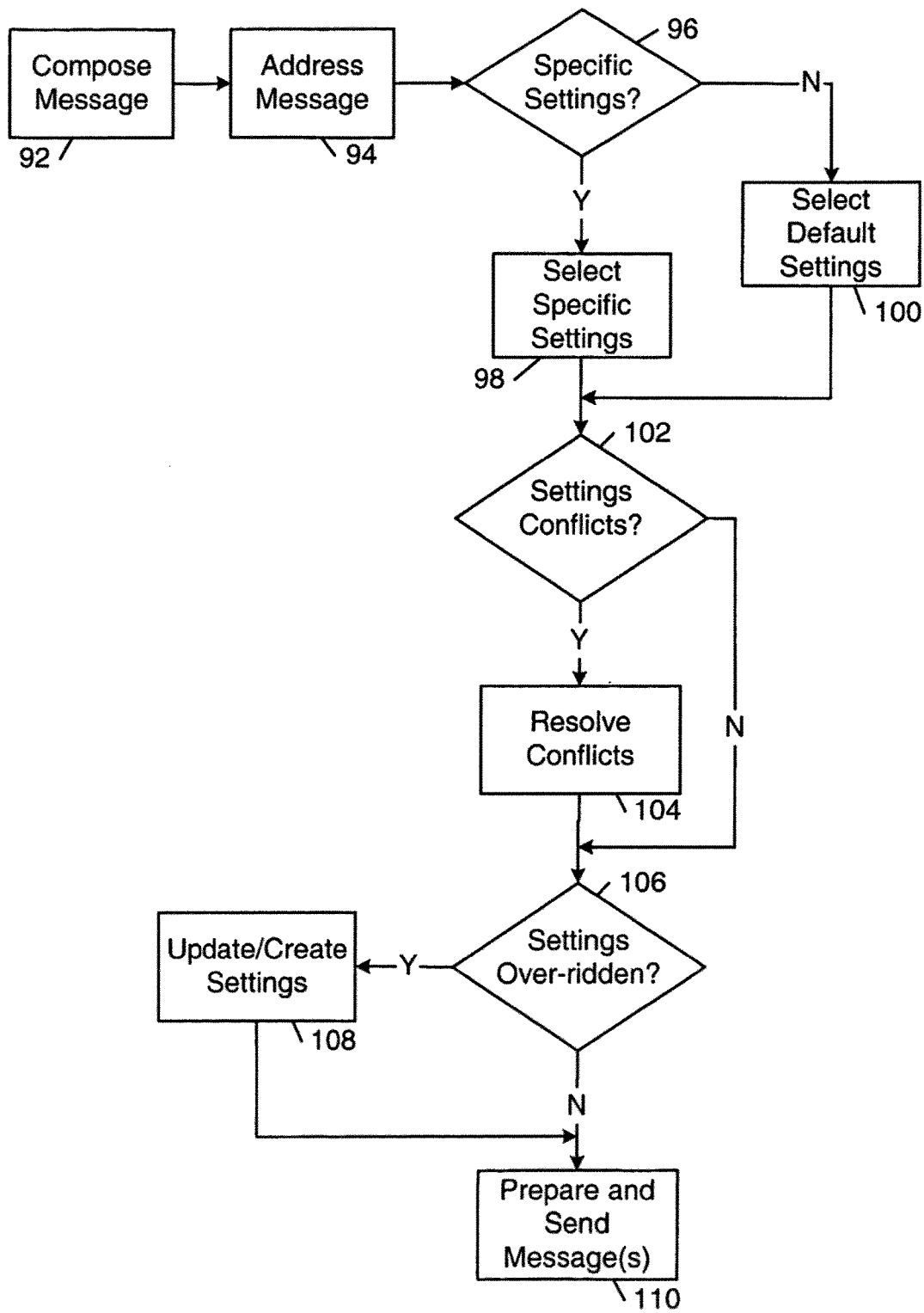
FIG. 5 is a flow chart illustrating a method of selecting messaging settings on a messaging client.

FIG. 5 is a flow chart illustrating a method of selecting messaging settings on a messaging client.

The method begins at step 92 when a message is composed. When the message is addressed to one or more intended recipients at step 94, the messaging client determines whether specific settings have been established for the recipients. If so, then the specific settings are selected, and optionally displayed, at step 98. Otherwise, default settings, if any, are selected at step 100. Any of the schemes described above may be used at step 96 to determine whether specific settings have been established, including checking an address book entry when a recipient address is selected from an address book, or searching an address book and settings store when a recipient address is entered manually or inserted by the messaging client.

When more than one recipient is addressed in an outgoing message, steps 96 through 100 are repeated for each recipient, and messaging settings conflicts are detected at step 102. Detected settings conflicts are then resolved at step 104, by alerting a user to the conflict and prompting the user to choose which message settings should be applied, for example.

If any specific settings are over-ridden by the user, whether to resolve a settings conflict or to change message settings for the outgoing message, as determined at step 106, existing default or specific messaging settings may be updated, or new specific messaging settings may be created, at step 108. If no settings have been over-ridden or messaging settings have been created or updated if required, the method proceeds to step 110, in which a message is prepared under the control of the messaging settings and sent to any addressed recipients. When the outgoing message is addressed to more than one recipient and different messaging settings are to be used to control message characteristics of the outgoing message, more than one message, each having different message characteristics, is prepared and sent at step 110.

Figure 6:
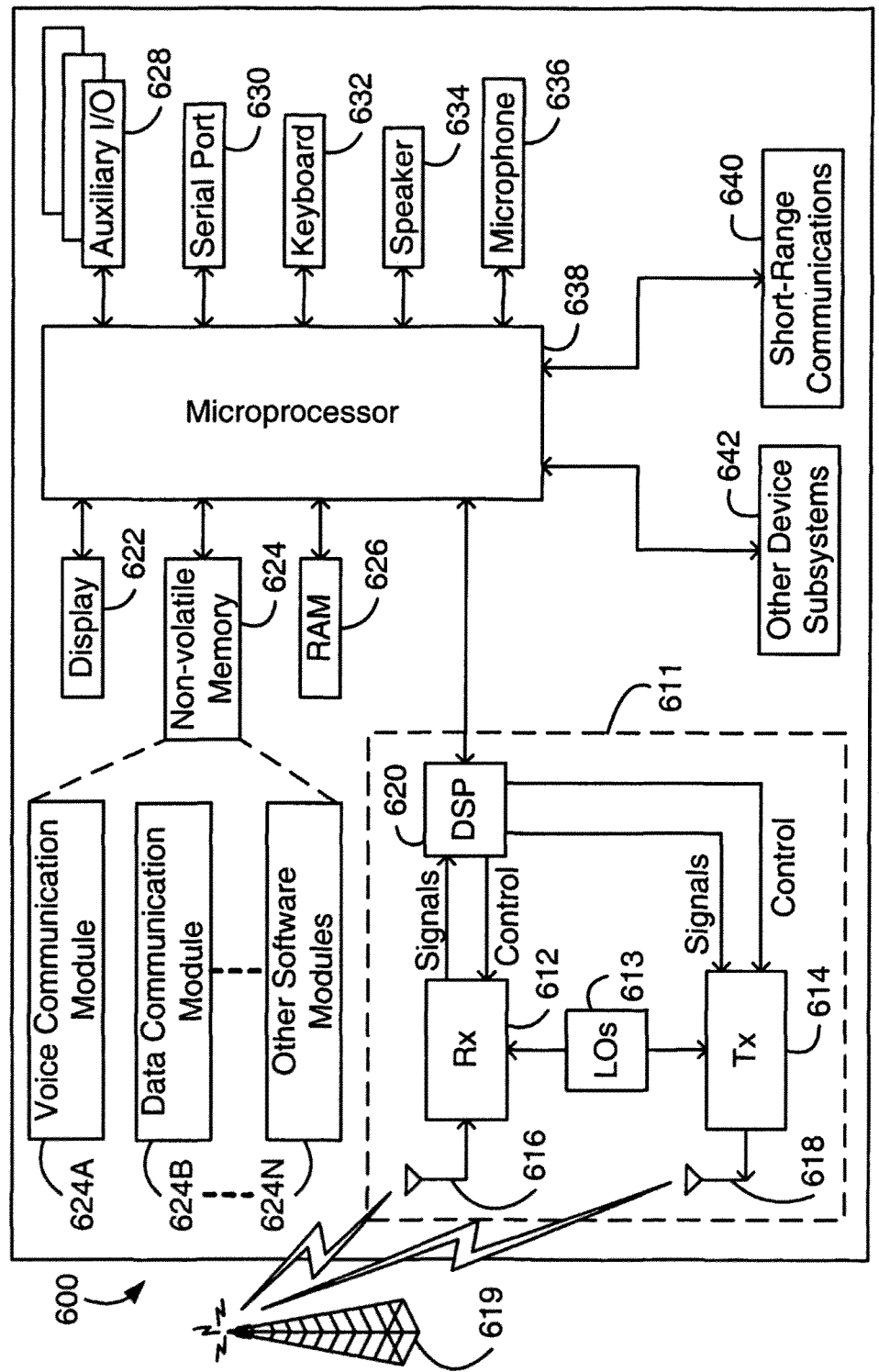
FIG. 6 is a block diagram of a wireless mobile communication device.

FIG. 6 is a block diagram of a wireless mobile communication device. The mobile device 600 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The dual-mode device 600 includes a transceiver 611, a microprocessor 638, a display 622, a non-volatile memory 624, a RAM 626, auxiliary input/output (I/O) devices 628, a serial port 630, a keyboard 632, a speaker 634, a microphone 636, a short-range wireless communications subsystem 640, and may also include other device sub-systems 642. The transceiver 611 preferably includes transmit and receive antennas 616, 618, a receiver (Rx) 612, a transmitter (Tx) 614, one or more local oscillators (LOs) 613, and a digital signal processor (DSP) 620. Within the non-volatile memory 624, the device 100 preferably includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for such operations as signal amplification, frequency down conversion, filtering, channel selection, and analog to digital conversion. Analog to digital conversion of the received signal allows more complex communication functions, including digital demodulation and decoding, for example, to be performed using the DSP 620. In a similar manner, signals to be transmitted to the network 619 are processed by the DSP 620 to modulate and encode the signals, for example, and the processed signals are then provided to the transmitter 614 for digital to analog conversion, frequency up conversion, filtering, amplification and transmission to the communication network 619 via the antenna 618. Although a single transceiver 611 is shown in FIG. 6 for both voice and data communications, the mobile device 600 may include two distinct transceivers, such as a first transceiver for transmitting and receiving voice signals, and a second transceiver for transmitting and receiving data signals, or multiple transceivers for operation in different operating frequency bands.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, a messaging client may operate in conjunction with the data communication module 624B in order to implement the techniques described above.

The microprocessor 638 also interacts with other device subsystems, such as the display 622, the non-volatile memory 624, the random access memory (RAM) 626, the auxiliary input/output (I/O) devices 628, the serial port 630, the keyboard 632, the speaker 634, the microphone 636, the short-range communications subsystem 640 and any other device subsystems generally designated as 642. The components 628, 632, 634, and 636 are examples of the types of subsystems that could be provided as the UIs 62 (FIG. 3). The modules 624A-N are executed by the microprocessor 638 and provide a high-level interface between a user of the mobile device and the mobile device. This interface typically includes a graphical component provided through the display 622, and an input/output component provided through the auxiliary I/O devices 628, the keyboard 632, the speaker 634, or the microphone 636.

Some of the subsystems shown in FIG. 6 perform communication-related functions, whereas other subsystems may provide "resident" or on-device functions. Notably, some subsystems, such as the keyboard 632 and the display 622 are used for both communication-related functions, such as entering a text message for transmission over a data communication network, and device-resident functions such as a calculator or task list or other PDA type functions.

Operating system software used by the microprocessor 638 is preferably stored in a persistent store such as the non-volatile memory 624. As those skilled in the art will appreciate, the non-volatile memory 624 may be implemented, for example, as a Flash memory device, a battery backed-up RAM, or a non-volatile memory chip and associated controller. Other suitable components or arrangements that provide data retention when power is lost will also be apparent to those skilled in the art. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the non-volatile memory 624.

An exemplary application module 624N that may be loaded onto the dual-mode device 600 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, and to load Certs, keys and other information onto a device. This wired download path may be used to load an encryption key onto the device, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be prepared as specified in selected messaging settings and transmitted over the communication network 619 via the transceiver 611.

When the mobile device 600 is operating in a voice communication mode, the overall operation of the mobile device 600 is substantially similar to the data mode, except that received signals are output to the speaker 634 and voice signals for transmission are generated by a microphone 636. Alternative voice or audio I/O subsystems, such as a voice message recording subsystem, may also be implemented on the mobile device 600. Although voice or audio signal output is accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

The short-range communications subsystem 640 may include any of the Cert loading interfaces described above for example, including an infrared device, an 802.11 module, a Bluetooth module, a USB port, an SD port, and a smart card reader. Although described above as Cert loading interfaces, these interfaces are also commonly used to transfer other types of data.

The above description relates to one example of the present invention. Many variations will be apparent to those knowledgeable in the field, and such variations are within the scope of the invention as described and claimed, whether or not expressly described.

For example, a messaging settings selection system or method may also be configured to store and access information other than messaging settings. Where a messaging client is enabled for both sending and receiving messages, characteristics of received messages provide an indication of the capabilities of a messaging client used by a sender. If a signed and encrypted S/MIME message is received from a particular sender, then it is likely that the sender's messaging client supports all of the S/MIME variants. As such, it may be useful to store messaging capabilities in addition to messaging settings, in an address book entry, a settings store, or a separate messaging capabilities store. Stored messaging capabilities may then be accessed and displayed to a user, for example, when a settings conflict is identified. Where specific messaging settings for a message addressee differ from those of another message addressee for the same message, stored messaging capabilities provide an indication as to whether the addressee might support the messaging settings of the other addressee. Capabilities information allows a user to make an informed decision as to how such messages with settings conflicts could or should be sent. Another possible application of messaging capabilities is in determining whether any discrepancy exists between established specific messaging settings for a contact and the types of messaging settings that appear to be supported by the contact. A user could be prompted to set secure messaging settings for a contact in an address book entry when a secure message is received from a contact for which no messaging settings, or only general messaging settings, have been established.

In addition, although a wireless mobile communication device is shown in FIG. 6 and described as one possible messaging client, the invention may also be implemented in other messaging clients, including those operating on or in conjunction with desktop, laptop, and networked computer systems.

The invention claimed is:

1. A method, comprising:
    storing, at a mobile device, a first specific messaging setting in association with a first recipient address, the first specific messaging setting controlling a message characteristic for outgoing messages addressed to the first recipient address;
    defining an address for a distribution list, the distribution list comprising a plurality of recipient addresses;
    storing a second specific messaging setting in association with the distribution list address, the second specific messaging setting controlling a message characteristic for outgoing messages addressed to the distribution list;
    after defining the distribution list and the distribution list address, adding the first recipient address to the distribution list; and
    in response to addition of the first recipient address to the distribution list,
    detecting a conflict between the first specific messaging setting and the second specific messaging setting;
    resolving the conflict by updating either the existing first specific messaging setting that is stored at the mobile device in association with the first recipient address or the existing second specific messaging setting that is stored at the mobile device in association with the distribution list address so that the existing first specific messaging setting or the existing second specific messaging setting is not in conflict; and
    after the conflict is resolved, receiving an instruction to initiate composition of a message addressed to the distribution list address.

2. The method of claim 1, further comprising:
    initiating transmission of a composed message addressed to the distribution list address after the conflict is resolved.

3. The method of claim 1, further comprising issuing a notification of the detected conflict in response to the addition of the first recipient address to the distribution list.

4. The method of claim 1, wherein the first recipient address comprises an address for a distinct distribution list address.

5. The method of claim 1, wherein storing the first specific messaging setting in association with the first recipient address comprises determining, from a message received from the first recipient address, messaging capabilities associated with the first recipient address, the first specific messaging setting being identified from the messaging capabilities.

6. The method of claim 1, wherein resolving the conflict comprises changing the first specific messaging setting to no longer be in conflict with the second specific messaging setting.

7. The method of claim 1, wherein resolving the conflict comprises changing the second specific messaging setting to no longer be in conflict with the first specific messaging setting.

8. The method of claim 1, wherein the first specific messaging setting controls encryption of outgoing messages addressed to the first recipient address.

9. The method of claim 1, wherein the first specific messaging setting controls application of a digital signature outgoing messages addressed to the first recipient address.

10. A communication device, including; a communication subsystem; at least one memory component; and
    a processor in communication with the communication subsystem and the at least one memory component, the processor being configured to enable:
    storing, in the at least one memory component, a first specific messaging setting in association with a first recipient address, the first specific messaging setting controlling a message characteristic for outgoing messages addressed to the first recipient address;
    defining an address for a distribution list, the distribution list comprising a plurality of recipient addresses;
    storing, in the at least one memory component, a second specific messaging setting in association with the distribution list address, the second specific messaging setting controlling a message characteristic for outgoing messages addressed to the distribution list;
    after defining the distribution list and the distribution list address, adding the first recipient address to the distribution list; and
    in response to addition of the first recipient address to the distribution list,
    detecting a conflict between the first specific messaging setting and the second specific messaging setting;
    resolving the conflict by updating either the existing first specific messaging setting that is stored in the at least one memory component in association with the first recipient address or the existing second specific messaging setting that is stored in the at least one memory component in association with the distribution list address so that the existing first specific messaging setting or the existing second specific messaging setting is not in conflict; and
    after the conflict is resolved, receiving an instruction to initiate composition of a message addressed to the distribution list address.

11. The communication device of claim 10, wherein the processor is further configured to enable:
    initiating transmission, using the communication subsystem, of a composed message addressed to the distribution list address after the conflict is resolved.

12. The communication device of claim 10, wherein the processor is further configured to enable issuing a notification of the detected conflict in response to the addition of the first recipient address to the distribution list.

13. The communication device of claim 10, wherein the first recipient address comprises an address for a distinct distribution list address.

14. The communication device of claim 10, wherein storing the first specific messaging setting in association with the first recipient address comprises determining, from a message received from the first recipient address, messaging capabilities associated with the first recipient address, the first specific messaging setting being identified from the messaging capabilities.

15. The communication device of claim 10, wherein resolving the conflict comprises changing the first specific messaging setting to no longer be in conflict with the second specific messaging setting.

16. The communication device of claim 10, wherein resolving the conflict comprises changing the second specific messaging setting to no longer be in conflict with the first specific messaging setting.

17. The communication device of claim 10, wherein the first specific messaging setting controls encryption of outgoing messages addressed to the first recipient address.

18. The communication device of claim 10, wherein the first specific messaging setting controls application of a digital signature outgoing messages addressed to the first recipient address.

19. A non-transitory computer-readable medium bearing code which, when executed by a processor of an electronic device, causes the device to implement the method of:
  storing a first specific messaging setting in association with a first recipient address, the first specific messaging setting controlling a message characteristic for outgoing messages addressed to the first recipient address;
  defining an address for a distribution list, the distribution list comprising a plurality of recipient addresses;
  storing a second specific messaging setting in association with the distribution list address, the second specific messaging setting controlling a message characteristic for outgoing messages addressed to the distribution list;
  after defining the distribution list and the distribution list address, adding the first recipient address to the distribution list; and
  in response to addition of the first recipient address to the distribution list,
  detecting a conflict between the first specific messaging setting and the second specific messaging setting;
  resolving the conflict by updating either the existing first specific messaging setting that is stored at the electronic device in association with the first recipient address or the existing second specific messaging setting that is stored at the electronic device in association with the distribution list address so that the existing first specific messaging setting or the existing second specific messaging setting is not in conflict; and
  after the conflict is resolved, receiving an instruction to initiate composition of a message addressed to the distribution list address.

* * * * *